United States Patent
Murad et al.

(10) Patent No.: US 11,070,707 B1
(45) Date of Patent: Jul. 20, 2021

(54) SYSTEM AND METHOD TO REMOVE A VEHICLE SHADOW FROM A VIDEO FEED

(71) Applicant: GM GLOBAL TECHNOLOGY OPERATIONS LLC, Detroit, MI (US)

(72) Inventors: Mohannad Murad, Troy, MI (US); Sai Vishnu Aluru, Commerce Township, MI (US); Yun Qian Miao, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 11 days.

(21) Appl. No.: 16/734,603

(22) Filed: Jan. 6, 2020

(51) Int. Cl.
*H04N 5/217* (2011.01)
*H04N 9/73* (2006.01)
*H04N 9/64* (2006.01)

(52) U.S. Cl.
CPC ............. *H04N 5/217* (2013.01); *H04N 9/646* (2013.01); *H04N 9/735* (2013.01)

(58) Field of Classification Search
CPC ....................................................... H04N 5/217
USPC ............................................................ 348/148
See application file for complete search history.

(56) References Cited

U.S. PATENT DOCUMENTS

| | | | |
|---|---|---|---|
| 2007/0018906 A1* | 1/2007 | Visnovsky ............... | G01J 3/46 345/1.1 |
| 2012/0008021 A1* | 1/2012 | Zhang ..................... | G06T 7/12 348/251 |
| 2014/0350836 A1* | 11/2014 | Stettner .................. | G01S 7/489 701/301 |
| 2018/0376079 A1* | 12/2018 | Shigemura ............ | G06T 3/4038 |

* cited by examiner

*Primary Examiner* — Daniel T Tekle
(74) *Attorney, Agent, or Firm* — Lorenz & Kopf LLP

(57) ABSTRACT

One general aspect includes a method to remove a vehicle shadow from image information, the method includes the steps of—determining a location of the vehicle shadow in an environment surrounding the vehicle, (based on the outcome of step) selecting one or more cameras installed on the vehicle, and removing the vehicle shadow from the image information produced by the one or more cameras.

12 Claims, 4 Drawing Sheets

SYSTEM AND METHOD TO REMOVE A VEHICLE SHADOW FROM A VIDEO FEED

INTRODUCTION

Vehicle cameras greatly assist vehicle operators when parking or backing out of a parking space. However, depending on the time of day, the vehicle's shadow, as it appears in the video feed images, can hinder the vehicle operator's ability to properly see potential obstacles during parking maneuvers. It is therefore desirable to provide a system and method that will seek out and remove a vehicle's shadow from camera views in real time. The solution of this system and method thus acts as a safety precaution to help a vehicle operator from hurting themselves, damaging their vehicle, or damaging someone else's property. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to remove a vehicle shadow from image information, the method including: (a) determining a location of the vehicle shadow in an environment surrounding the vehicle; (b) based on the outcome of step (a), selecting one or more cameras installed on the vehicle; and (c) removing the vehicle shadow from the image information produced by the one or more cameras. Other embodiments of this aspect include corresponding computer systems, apparatus, and computer programs recorded on one or more computer storage devices, each configured to perform the actions of the methods.

Implementations may include one or more of the following features. The method further including: (d) receiving weather information for the environment surrounding the vehicle; and when the weather information provides that the environment is at least partially sunny, the method will move to step (a). The method further including: (d) receiving vehicle location data; (e) receiving time information; (f) based on the outcome of step (d), calculating a direction of travel for the vehicle; and where step (a) is based on the outcome of steps (e) and (f). The method further including: (d) before step (c), determining that an auto white balance of the image information is greater than or equal to 4000 Kelvins; and when the auto white balance is greater than or equal to 4000 Kelvins, the method will move to step (c). The method further including: (d) segmenting the image information into a plurality of segments. The method further including: (d) calculating one or more edges of the image information; and (e) developing an intensity map for the image information. The method where: step (c) is further defined as: (1) generating a chromaticity representation of the image information; (2) generating an illumination invariant representation of the chromaticity representation; (3) normalizing and linearizing the illumination invariant; and (4) returning color to the illumination invariant. Implementations of the described techniques may include hardware, a method or process, or computer software on a computer-accessible medium.

One general aspect includes a system to remove a vehicle shadow from image information, the system includes: a memory configured to include one or more executable instructions and a processor configured to execute the executable instructions, where the executable instructions enable the processor to carry out the following steps: (a) determining a location of the vehicle shadow in an environment surrounding the vehicle; (b) based on the outcome of step (a), selecting one or more cameras installed on the vehicle; and (c) removing the vehicle shadow from the image information produced by the one or more cameras. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to carry out the following additional steps: (d) receiving weather information for the environment surrounding the vehicle; and when the weather information provides that the environment is at least partially sunny, the method will move to step (a). The system where the executable instructions enable the processor to carry out the following additional steps: (d) receiving vehicle location data; (e) receiving time information; (f) based on the outcome of step (d), calculating a direction of travel for the vehicle; and where step (a) is based on the outcome of steps (e) and (f). The system where the executable instructions enable the processor to carry out the following additional steps: (d) before step (c), determining that an auto white balance of the image information is greater than or equal to 4000 Kelvins; and when the auto white balance is greater than or equal to 4000 Kelvins, the method will move to step (c). The system where the executable instructions enable the processor to carry out the following additional step: (d) segmenting the image information into a plurality of segments. The system where the executable instructions enable the processor to carry out the following additional steps: (d) calculating one or more edges of the image information; and (e) developing an intensity map for the image information. Implementations of the described techniques may include hardware, a method or process, or computer software on a computer-accessible medium. The system where step (c) is further defined as: (1) generating a chromaticity representation of the image information; (2) generating an illumination invariant representation of the chromaticity representation; (3) normalizing and linearizing the illumination invariant; and (4) returning color to the illumination invariant. Other embodiments of this aspect include corresponding computer systems, apparatus, and computer programs recorded on one or more computer storage devices, each configured to perform the actions of the methods.

One general aspect includes a non-transitory and machine-readable medium having stored thereon executable instructions adapted to remove a vehicle shadow from image information, which when provided to a processor and executed thereby, causes the processor to carry out the following steps: (a) determining a location of the vehicle shadow in an environment surrounding the vehicle; (b) based on the outcome of step (a), selecting one or more cameras installed on the vehicle; and (c) removing the vehicle shadow from the image information produced by the one or more cameras. Other embodiments of this aspect include corresponding computer systems, apparatus, and computer programs recorded on one or more computer storage devices, each configured to perform the actions of the methods.

Implementations may include one or more of the following features. The non-transitory and machine-readable medium further including the following steps: (d) receiving weather information for the environment surrounding the vehicle; and when the weather information provides that the environment is at least partially sunny, the method will move to step (a). The non-transitory and machine-readable medium further including the following steps: (d) receiving vehicle location data; (e) receiving time information; (f) based on the outcome of step (d), calculating a direction of travel for the vehicle; and where step (a) is based on the outcome of steps (e) and (f). The non-transitory and machine-readable medium further including the following steps: (d) before step (c), determining that an auto white balance of the image information is greater than or equal to 4000 Kelvins; and when the auto white balance is greater than or equal to 4000 Kelvins, the method will move to step (c). The non-transitory and machine-readable medium further including the following steps: (d) segmenting the image information into a plurality of segments. The non-transitory and machine-readable medium further including the following steps: (d) calculating one or more edges of the image information; and (e) developing an intensity map for the image information. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
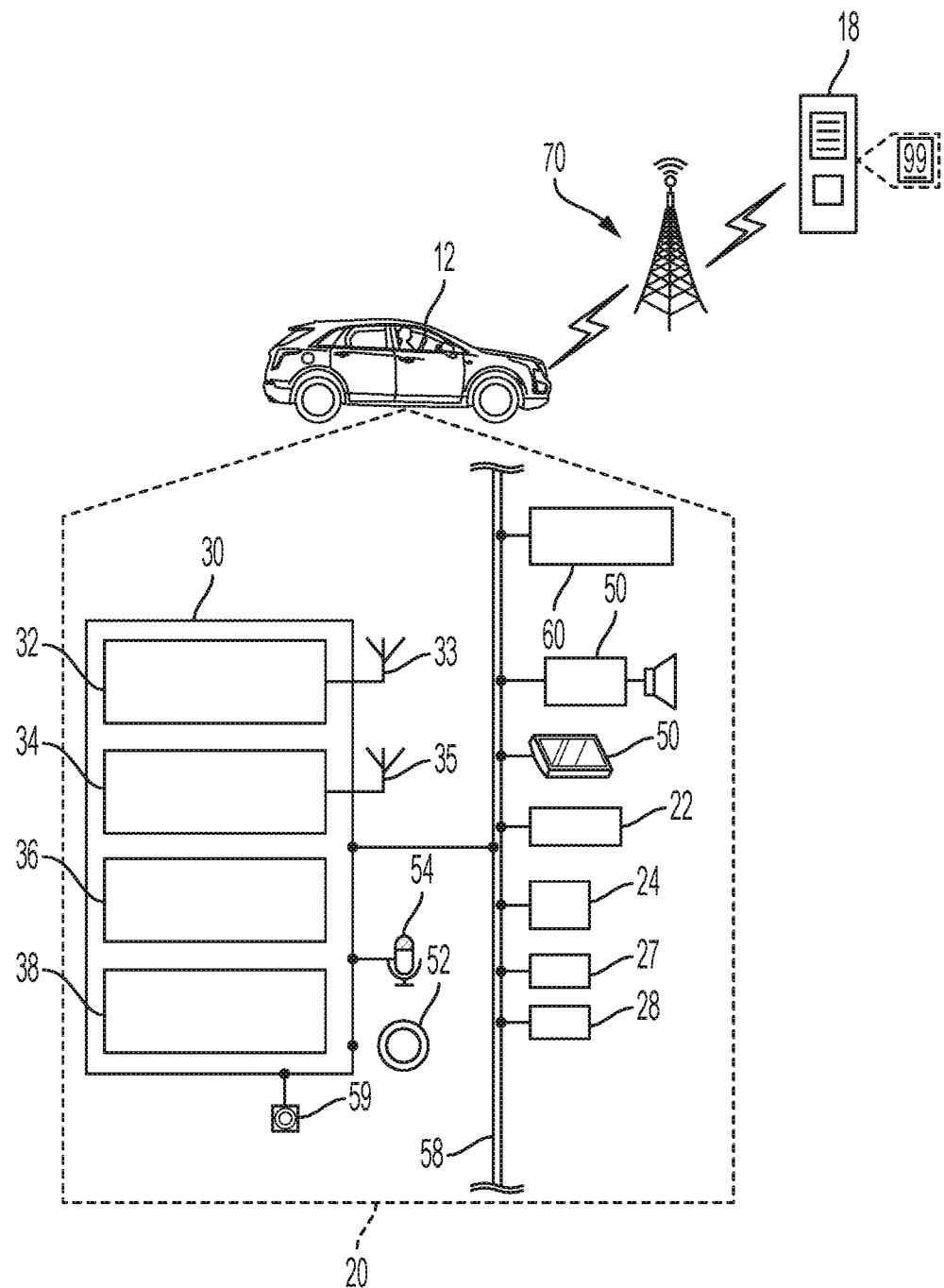
FIG. 1 is a block diagram depicting an exemplary embodiment of an electronics system capable of utilizing the system and method disclosed herein.

With reference to FIG. 1, vehicle 12 is depicted in the illustrated embodiment as a sports utility vehicle (SUV), but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-59, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, air bag module 29, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a remote computer (e.g., computer 18) or facility via a land network (not shown) and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the telematics unit 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, controlling an electronic parking brake, power sun/moon roof, the vehicle's head lamps, air conditioning operations, power mirrors, controlling the vehicle primary mover (e.g., engine, primary propulsion system), and/or controlling various other vehicle system modules (VSMs).

Onboard computer 60 can otherwise be known as an electronic control unit (ECU) and controls one or more of the electrical systems or subsystems of vehicle 12. As follows, onboard computer 60 functions as a central vehicle computer that can be used to carry out various vehicle tasks. Also, one or more other VSMs can be incorporated with or controlled by onboard computer 60. These VSMs can include, but are not limited to, the engine control module (ECM), powertrain control module (PCM), transmission control module (TCM), body control module (BCM), brake control module (EBCM), center stack module (CSM), central timing module (CTM), general electronic module (GEM), body control module (BCM), and suspension control module (SCM).

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone). Additionally, in some embodiments, the telematics unit 30 contains a cellular chipset 34 thereby allowing the device to communicate via one or more cellular protocols, such as those used by cellular carrier system 70, through antenna 35.

In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the telematics unit 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Telematics unit 30 may, via cellular chipset 34, communicate data over wireless carrier system 70, for example to and from a third-party computer 18. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or a call center, or both. A computer 18 can also be used for providing Internet connectivity such as DNS services or as a network address server that uses DHCP or other suitable protocol to assign an IP address to the vehicle 12.

Computer 18 can store a weather prediction/forecasting application 99 (e.g., RADARSCOPE™, DARK SKIES WEATHER™, WEATHER BUG™, THE WEATHER COMPANY™, etc.) which provides location-based reporting live and forecast data on hyperlocal weather to system users. In particular, the weather app 99 can provide users with meteorological data such as temperature, wind, and visibility on a minute-by-minute, hourly, or daily basis, as well as an extended 10-day forecast. For example, the weather app 99 can implement Doppler radar and satellite imaging to attain the current weather of a certain area (e.g., the vehicle location) and/or predict the weather of that area based on location information feedback from a system user or some other device (e.g., vehicle 12).

Processor 36 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, and one or more cameras 59. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics unit 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one particular implementation.

The one or more cameras 59 can be of the digital variety and can capture one or more images (i.e., video feed or image information), which can then be transmitted to telematics unit 30 and processor 36. To name a few locations, the camera(s) 59 can be installed on the rear fascia of the vehicle body, the front fascia of the vehicle body, one or more of the vehicle's side-view mirrors, one or more of the vehicle's A-pillars, or the vehicle's undercarriage. In addition, the one or more cameras 59 can be positioned around the vehicle body to capture a video feed that will assist a vehicle operator in parking vehicle 12.

METHOD

Figure 2:
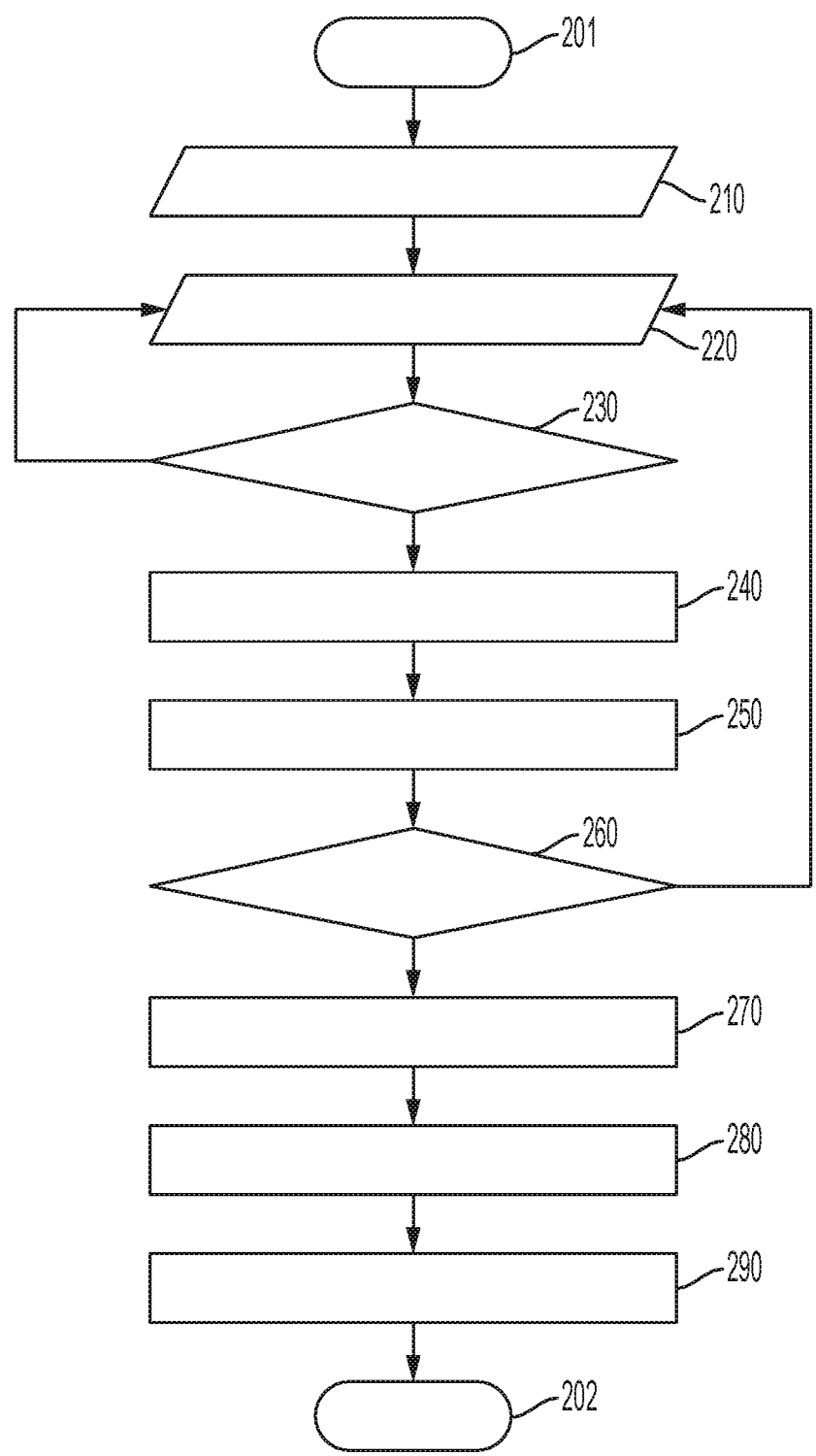
FIG. 2 is an exemplary flow chart for the utilization of exemplary system and method aspects disclosed herein.

Turning now to FIG. 2, there is shown an embodiment of a method 200 to remove the shadow of vehicle 12 from the video feed created by one or more cameras 59 installed on the body of vehicle 12. For example, method 200 can remove the vehicle shadow from a parking assist video feed. One or more aspects of vehicle shadow removal method 200 may be carried out by electronics control module 60 (i.e., onboard computer 60) implementing a memory and processor to complete the method steps. Skilled artists will also see that one or more aspects of vehicle shadow removal method 200 could alternatively/additionally be carried out by telematics unit 30. For example, in order to carry out the one or more aspects of method 200, memory 38 includes executable instructions stored thereon and processor 36 executes these executable instructions. One or more ancillary aspects of method 200 may also be completed by one or more vehicle devices such as, for example, camera 59, and the GNSS receiver 22.

Method 200 begins at 201 in which it is daytime (i.e., sometime after dawn and before dusk). In step 210, vehicle location information for at least one point in time will be provided by the GNSS receiver 22. In this step, time information will also be provided by a clock program that is stored in onboard computer 60 and/or memory 38. In step 220, the most current vehicle location information (and, in certain instances, the time information) will be wirelessly transmitted to weather app 99. In return, weather app 99 will provide weather information that pertains to the environment currently surrounding the vehicle 12. This weather information will also provide a disposition on the level of sunlight in the vehicle environment.

In step 230, the weather information will be analyzed and it will be determined whether or not it is at least partly sunny in the vehicle environment. As follows, the possibility of vehicle shadows in the video feed is unlikely when it is not at least partly sunny in the vehicle environment. Skilled artists will understand that a partly sunny disposition is one that between ⅜ and ⅝ of the sky is covered by clouds. Thus, a cloudy disposition is one that more than ⅝ of the sky is covered by clouds, a mostly sunny disposition is one that less than ⅜ of the sky is covered by clouds, and a sunny disposition is one that the sky is not covered by any clouds or covered by a nominal amount of clouds. Moreover, when it is determined that the sky is at least partly sunny, method 200 will move to step 240; otherwise, method 200 will return to step 220.

In step 240, a direction of travel for the vehicle 12 will be calculated. As follows, the vehicle location information for at least two points in time will be compared to determine the direction of travel. In addition, in this step, using the direction of vehicle travel information, vehicle location information, and time information, the location of the vehicle's shadow in the environment surrounding the vehicle will be estimated. As such, the time information can be used to calculate approximately where the sun will be located in relation to the vehicle location and then the direction of travel can be used to calculate where the vehicle's shadow will be relation to the vehicle's body. For example, at high noon, on the summer solstice, and at a location on or near the earth's equator, it may be estimated that the vehicle's shadow is directly under the vehicle 12 (regardless of the direction of travel). However, sometime during a late October afternoon, when the vehicle is traveling west in one of the New England states (e.g., Massachusetts), it may be estimated that the vehicle's shadow is directly behind vehicle 12. It should also be understood that the direction of vehicle travel information, vehicle location information, and time information can be provided to a lookup table to determine where the vehicle's shadow is located in relation to the vehicle's body.

Figure 3:
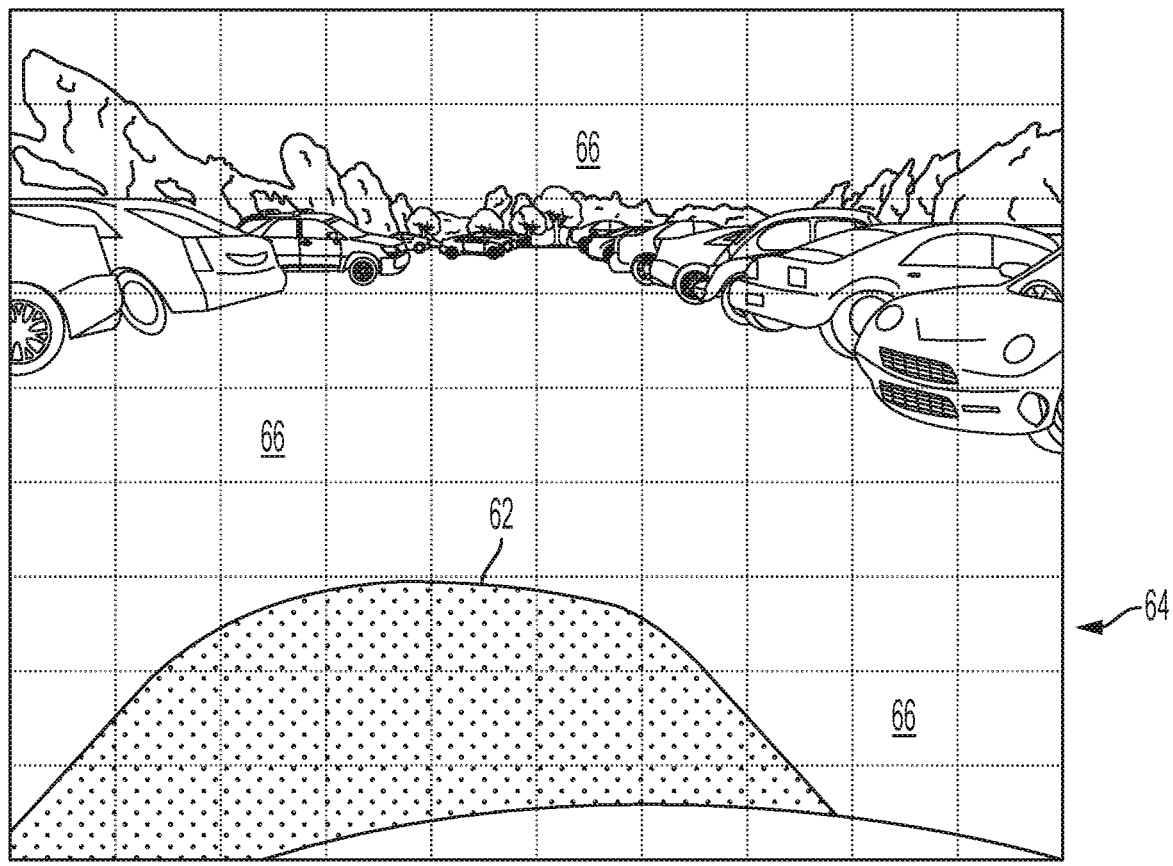
FIG. 3 is an illustrative aspect of the process flow of FIG. 2.
Figure 4:
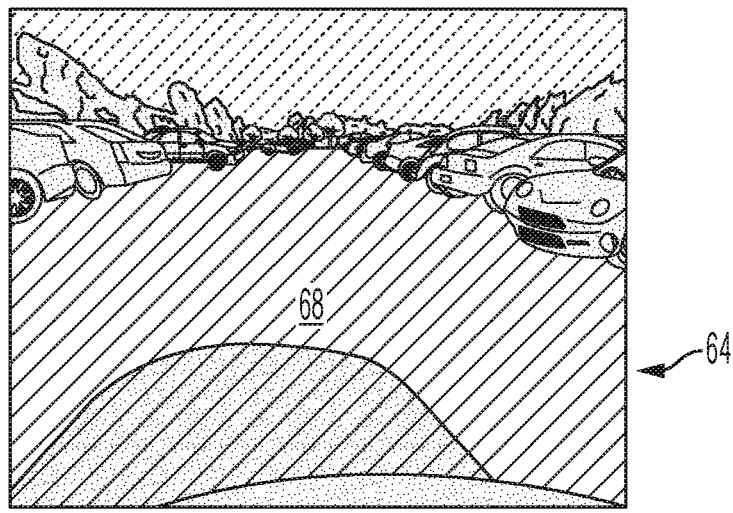
FIG. 4 is another illustrative aspect of the process flow of FIG. 2.

In step 250, with additional reference to FIG. 3, one or more specific vehicle body cameras 59 will be selected. In addition, the video feed 64 of the selected one or more cameras 59 will be processed for shadow removal. As follows, this video feed selection is based on the where the vehicle's shadow is estimated to be in relation to the vehicle's body. For example, when the vehicle's shadow 62 is estimated to fall behind the vehicle 12, the backup camera 59 will be selected for video feed processing. In another example, when the shadow 62 is estimated to fall to the right or left of the vehicle 12, the respective A-pillar camera 59 and/or sideview mirror camera 59 will be selected for video feed processing.

In step 260, to ensure that a shadow 62 exists in the video feed, a reading of the auto white balance (AWB) register associated with the video feed will be conducted. When the AWB is greater than or equal to 4000 Kelvins, method 200 will move to 270 because the color temperature read of the video feed will indicate that the video feed images are of a bright sunny or at least partly sunny day. However, when the AWB is less than 4000 Kelvins, then method 200 will return to step 220.

In step 270, image segmentation is applied to one or more images of the video feed. For example, the video feed images may be divided into thirty two (32) distinct and separate image segment blocks 66. Skilled artists will see that image segmentation of this nature will reduce processing time and memory space because the shadow removal technique (discussed below) can be applied only to the image segments 66 that include the presence of the vehicle shadow. In step 280, the edges of the video feed images will be calculated to get a precise reading on the location of the edges of the images and image contours. In addition, in this step, an intensity map (not shown) will be developed to provide luminance values and gradients of portions of the video feed image so as to help identify the exact locations of the vehicle shadow in the video feed.

Figure 5:
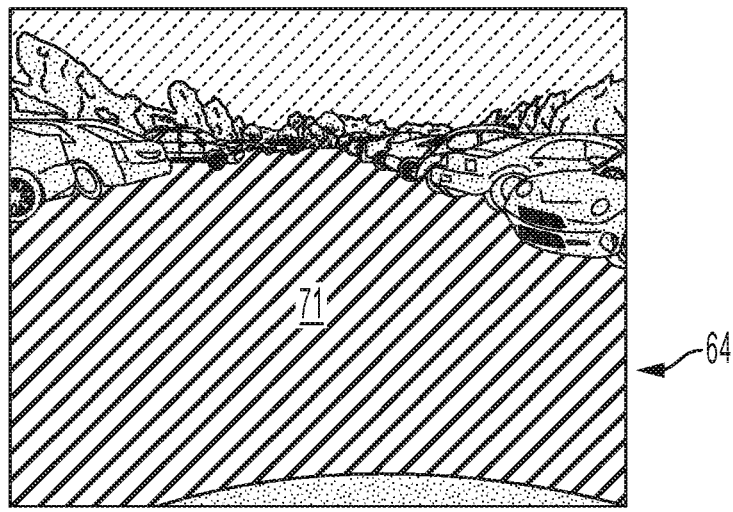
FIG. 5 is another illustrative aspect of the process flow of FIG. 2.

In step 280, the process of removing the vehicle shadow from the video feed images begins. As such, in a first subset step, with additional reference to FIG. 5, a chromaticity representation 68 of the video feed images is generated. As such, the color information will be separated out from the luminance of the video feed images. The chromaticity representation can be generated through an application of the following equation:

$$x_i = \log \frac{\{R, G, B\}}{\sqrt[3]{R \times G \times B}}$$

where Xi represents the color channel representation of the vide feed images, R represents the red channel of the video feed images, G represents the green channel of the video feed images, and B represents the blue channel of the video feed images.

Figure 6:
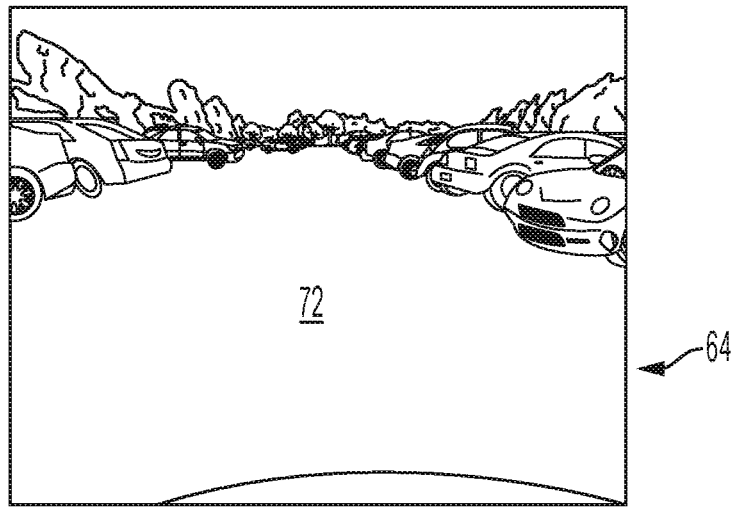
FIG. 6 is another illustrative aspect of the process flow of FIG. 2.

Additionally, in a second subset step, with additional reference to FIG. 6, an illumination invariant representation 71 of the video feed chromaticity representation 68 represents generated. The illumination invariant representation can be generated through an application of the following equation:

$$\tilde{X}' = P_e \underline{X}$$

$$w.r.t P_e = \underline{e}\underline{e}^T$$

where $P_e$ represents the color space projector matrix, e represents the projecting vector that represents the invariant log-chromaticity direction, and $e^T$ represents the transpose operator of the vector e. Additionally, X' represents the corrected color channel, and X represents the channel of the color space inheriting from previous step.

In a final subset step, with additional reference to FIG. 6, the video feed images are normalized and linearized. Moreover, colors are added back into the video feed images to create a shadow-free recovery of the video feed images 72. The shadow-free recovery images can be generated by applying the following equation:

$$\tilde{X}_n' = \tilde{X}' + a_E$$

where $X'_n$ represents the shadow-free images, and $a_E$ represents the light intensity being added back to the video feed images. After step 280, method 200 moves to completion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to remove a vehicle shadow from image information, the method comprising:
   determining a location of the vehicle shadow in an environment surrounding a vehicle in response to a vehicle location and a time of day;
   selecting one or more cameras installed on the vehicle in response to the location of the vehicle shadow being within a field of view of the one or more cameras;
   determining that an auto white balance of the image information is greater than or equal to a threshold; and
   removing the vehicle shadow from the image information produced by the one or more cameras in response to the auto white balance being greater than or equal to the threshold, wherein the vehicle shadow is removed from the image information by segmenting the image information into a plurality of image segments, generating a chromaticity representation for each of the plurality of image segments, generating an illumination invariant representation of the chromaticity representation for each of the plurality of image segments, normalizing and linearizing the illumination invariant representation for each of the plurality of image segments and returning the chromaticity representation to the illumination invariant representation for each of the plurality of image segments.

2. The method of claim 1, further comprising:
   receiving weather information for the environment surrounding the vehicle; and
   determining the location of the vehicle shadow in response to weather information providing that the environment is at least partially sunny.

3. The method of claim 1, further comprising:
   (f) calculating a direction of travel for the vehicle; and
   wherein the location of the vehicle shadow is determined in response to the direction of travel for the vehicle.

4. The method of claim 1, further comprising:
   calculating one or more edges of the image information; and
   developing an intensity map for the image information.

5. A system to remove a vehicle shadow from image information, the system comprises:
   memory configured to comprise one or more executable instructions and a processor configured to execute executable instructions, wherein the executable instructions enable the processor to carry out the following steps:
   determining a location of the vehicle shadow in an environment surrounding a vehicle in response to a vehicle location and a time of day;
   selecting one or more cameras installed on the vehicle in response to the location of the vehicle shadow being within a field of view of the one or more cameras;
   determining that an auto white balance of the image information is greater than or equal to a threshold; and
   removing the vehicle shadow from the image information produced by the one or more cameras in response to the auto white balance being greater than or equal to the threshold, wherein the vehicle shadow is removed from the image information by segmenting the image information into a plurality of image segments, generating a chromaticity representation for each of the plurality of image segments, generating an illumination invariant representation of the chromaticity representation for each of the plurality of image segments, normalizing and linearizing the illumination invariant representation for each of the plurality of image segments and returning the chromaticity representation to the illumination invariant representation to each of the plurality of image segments.

6. The system of claim 5, wherein the executable instructions enable the processor to carry out the following additional steps:
receiving weather information for the environment surrounding the vehicle; and
determining the location of the vehicle shadow in response to weather information providing that the environment is at least partially sunny.

7. The system of claim 5, wherein the executable instructions enable the processor to carry out the following additional steps:
calculating a direction of travel for the vehicle; and
wherein the location of the vehicle shadow is determined in response to the direction of travel for the vehicle.

8. The system of claim 5, wherein the executable instructions enable the processor to carry out the following additional steps:
calculating one or more edges of the image information; and
developing an intensity map for the image information.

9. A non-transitory and machine-readable medium having stored thereon executable instructions adapted to remove a vehicle shadow from image information, which when provided to a processor and executed thereby, causes the processor to carry out the following steps:
determining a location of the vehicle shadow in an environment surrounding a vehicle in response to a vehicle location and a time of day;
selecting one or more cameras installed on the vehicle in response to the location of the vehicle shadow being within a field of view of the one or more cameras;
determining that an auto white balance of the image information is greater than or equal to a threshold; and
removing the vehicle shadow from the image information produced by the one or more cameras in response to the auto white balance being greater than or equal to the threshold, wherein the vehicle shadow is removed from the image information by segmenting the image information into a plurality of image segments, generating a chromaticity representation for each of the plurality of image segments, generating an illumination invariant representation of the chromaticity representation for each of the plurality of image segments, normalizing and linearizing the illumination invariant representation for each of the plurality of image segments and returning the chromaticity representation to the illumination invariant representation to each of the plurality of image segments.

10. The non-transitory and machine-readable medium of claim 9, further comprising the following steps:
receiving weather information for the environment surrounding the vehicle; and
determining the location of the vehicle shadow in response to weather information providing that the environment is at least partially sunny.

11. The non-transitory and machine-readable medium of claim 9, further comprising the following steps:
calculating a direction of travel for the vehicle; and
wherein the location of the vehicle shadow is determined in response to the direction of travel for the vehicle.

12. The non-transitory and machine-readable medium of claim 9, further comprising the following steps:
calculating one or more edges of the image information; and
developing an intensity map for the image information.

* * * * *